May 31, 1949.　　　　　B. E. MOLTZ　　　　　2,471,642
WHEEL SUPPORTING STAND FOR TIRE CHANGING
Filed Nov. 9, 1946　　　　　　　　　　　　　3 Sheets-Sheet 1

INVENTOR.
BENJAMIN E. MOLTZ
BY
ATTORNEY

May 31, 1949.  B. E. MOLTZ  2,471,642
WHEEL SUPPORTING STAND FOR TIRE CHANGING
Filed Nov. 9, 1946  3 Sheets-Sheet 2

INVENTOR.
BENJAMIN E. MOLTZ
BY
Baldwin Yale
ATTORNEY.

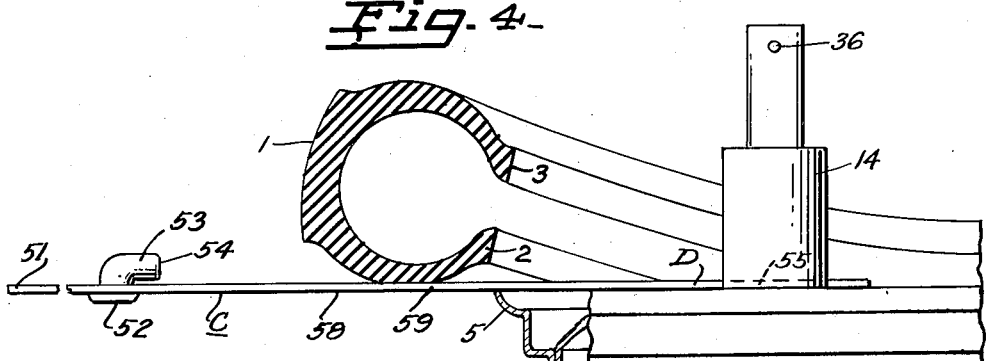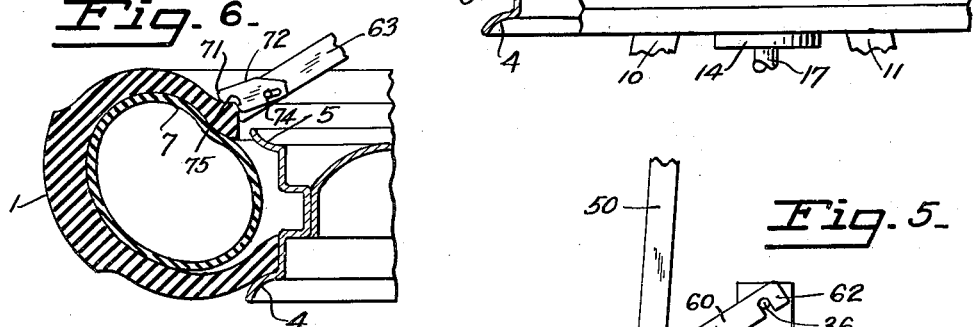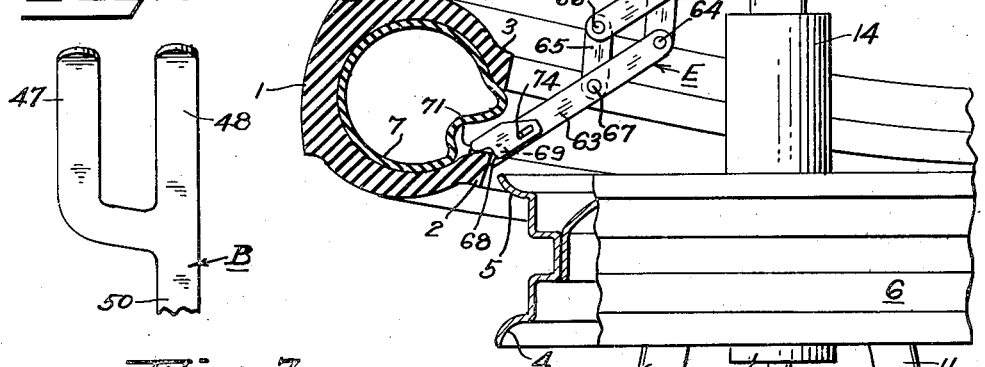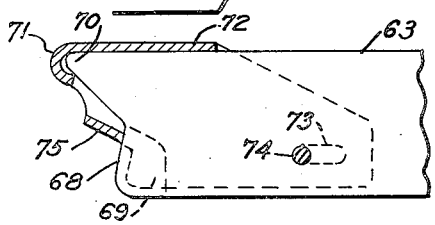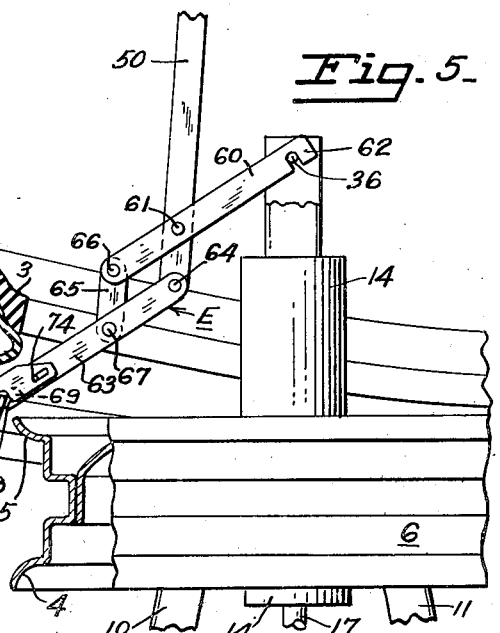

Patented May 31, 1949

2,471,642

UNITED STATES PATENT OFFICE 2,471,642

WHEEL SUPPORTING STAND FOR TIRE CHANGING

Benjamin E. Moltz, Gridley, Calif.

Application November 9, 1946, Serial No. 708,973

2 Claims. (Cl. 144—288)

This invention relates to wheel supporting stand for tire changing and more particularly to manual means for mounting and dismounting tires from wheels and rims. Reference is here made to my copending application, Serial No. 624,137, in the same class.

Among the objects of the invention is the provision of a machine for rigidly supporting a vehicle wheel having a pneumatic tire assembly thereon.

Another object is the provision of manual accessories adapted to be operated in combination with said wheel support for the easy and rapid release of the tire bead from the rim of the wheel to which it may be adhering.

Another object is the provision of another accessory for similarly expanding the circumference of the tire bead and releasing it from the rim flange.

Another object is the provision of an accessory for completely removing the tire from the rim.

A further object is the provision of an accessory for restoring the inner and outer beads of the tire to their operating positions on the rim.

Other objects and advantages will appear as the description proceeds. In the specification and the accompanying drawings the invention is disclosed in its preferred forms. But it is to be understood that it is not limited to these forms shown, because it may be embodied in modifications within the spirit of the invention as defined in the claims following the description.

In the three sheets of drawings:

Fig. 4 is a similar view showing the fourth step of completely removing the whole tire from the rim.

Fig. 5 is a similar view showing the fifth step of remounting the inner bead on the rim.

Fig. 6 is a similar view showing the sixth step of reclinching the outer bead beneath the top flange of the rim, which is a repetition of the act of remounting the inner bead, as in the preceding figure.

Fig. 7 is a detail in vertical section of the end shield on the pusher head of the tool E.

Fig. 8 is a fragmentary detail in front elevation of the head of a tire accessory.

Figure 1:
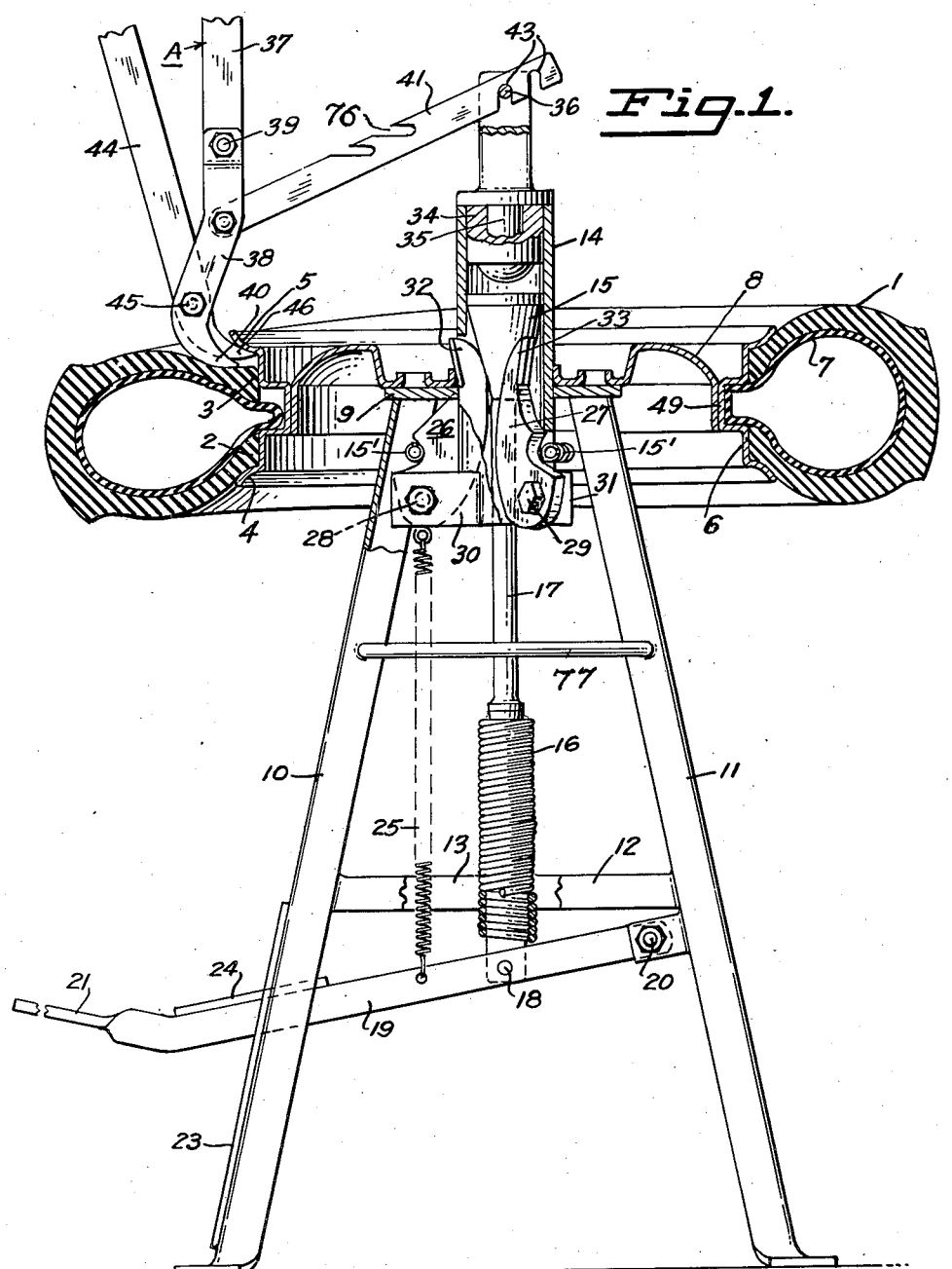
Fig. 1 is a side elevation, partly in vertical section of a tire machine constructed in accordance with this invention, and showing the first step in dislodging the outer bead of the tire from the rim flange.
Figure 2:
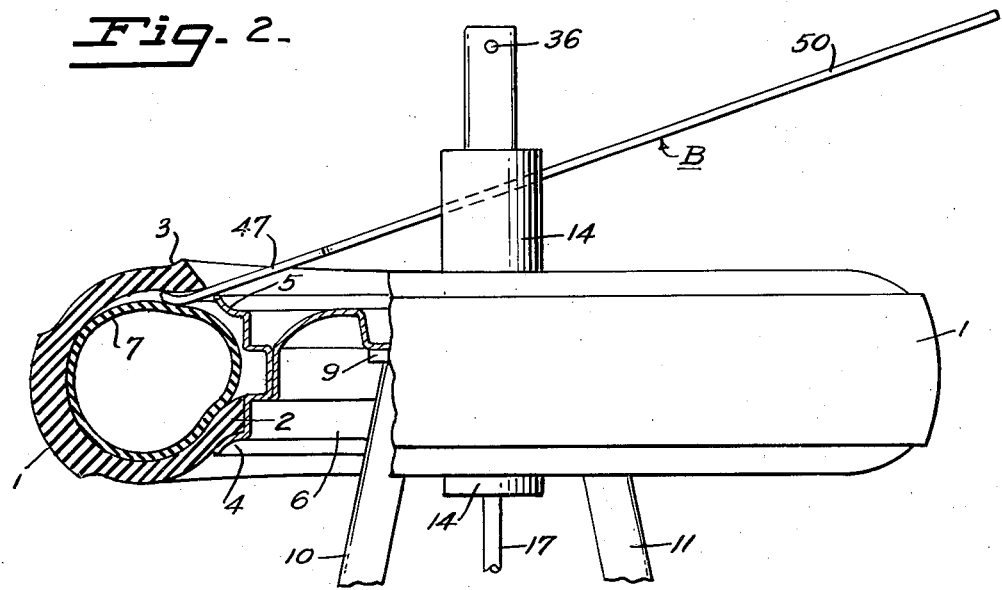
Fig. 2 is a similar view in fragmentary detail, showing the second step in the removal of the outer bead of the tire from the rim.
Figure 3:
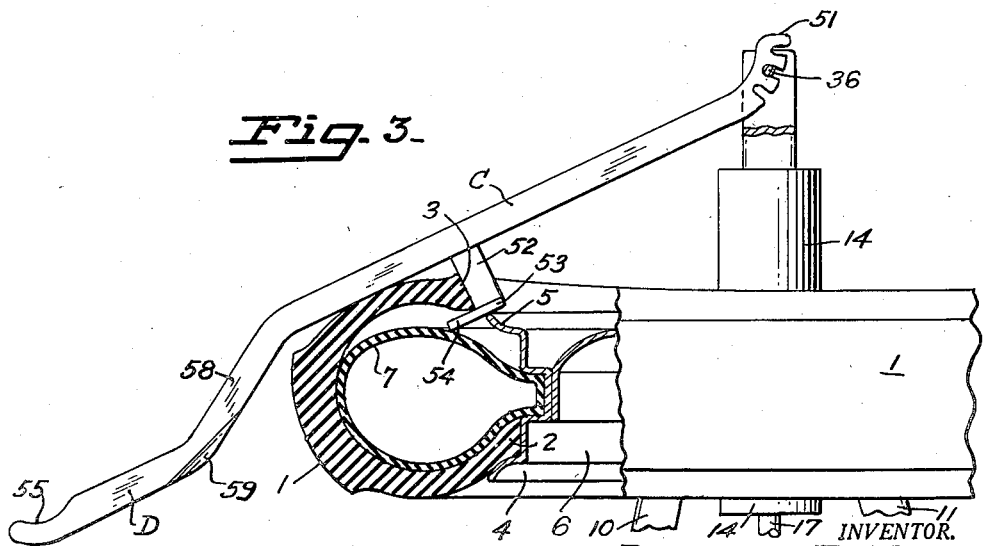
Fig. 3 is a similar view showing the third step of completely removing the outer bead from the rim flange.

The conventional pneumatic tire comprises the rubber impregnated fabric casing 1, having the inner and outer beads 2, 3, that are flexible and expansive enough to be forced over the inner and outer flanges 4, 5, of the rim 6. The casing has the inner tube 7 with a valve stem extending through the rim.

The disc wheel 8 has a peripheral flange riveted or welded to the inner perimeter of the rim. The wheel disc has a central opening to receive the flanged wheel hub, not shown, to which it is bolted.

Barring injury to the casing in use, a tire may stay on the rim long enough to adhere tightly and be difficult to remove, because of the adhesive nature of the composition of the tire and the rubber coated beads 2, 3.

Heretofore, it has been the practice to dismount the wheel from the hub and lay it upon the floor with the tire casing deflated. If the beads are stuck, the sides of the casing are pounded with a heavy hammer until a tire iron can be driven between the bead and the flange. After much mechanical abuse the bead is pried over the edge of the flange. This method often causes internal injury to the fabric of the casing resulting in dangerous blowouts in traffic. Because of these time consuming difficulties tire work is not solicited by service stations resulting in inconvenience to the automobile users.

With the present machine even a seriously adhesive tire casing can be removed from the wheel in five minutes, often less, without injury to the tire or equipment with minimum effort by the operator.

Referring to Fig. 1, the present invention comprises the base plate 9 supported upon legs such as 10, 11, preferably three in number and adapted to be fastened to the floor or a movable platform upon which the operator stands. These legs are cross braced as at 12, 13 to give stability to the supporting structure.

The plate 9 has the axial tube 14 projecting therethrough and welded to the plate. This tube also acts as an anchor pivot. The tapered cam 15 is vertically slidable within the tube 14 and projects below the plane of the plate 9. The stiff spiral spring 16 is threaded on the lower end of the stem 17 of the cam and pivoted at 18 to the pedal lever 19, pivoted at 20 in the bracket welded to the inner side of the leg 11. This lever has the foot pedal 21, extending beyond the frame.

The lever 19 is guided in the front portion of the frame in the guide 23 which has ratchet teeth engageable with the pawl plate 24, fixed to the upper edge of the lever 19. The weight of the cam assembly is supported by the spring 25, interposed between the tube 14 and the lever 19.

The downwardly tapered cam 15 cooperates with the surrounding clamp jaws such as 26, 27, respectively pivoted at 28, 29 on the brackets such as 30, 31, welded to the outside of the lower end of the tube 14. These three jaws have heads such as 32, 33, projecting outward through slots in the tube 14 and are provided with beveled edges adapted to engage the hub opening through the disc wheel 8. The inner curved edges of these jaws bear against the tapered surface of the cam 15, under tension of the spring 16 when the lever 19 is locked down by the ratchet guide 23, 24.

The top of the tube 14 has the bushing 34 fixed therein and provides a bearing for the rotatable stem 35 having the upwardly extending yoke with the cross pin 36. This pin acts as a fulcrum for the various manual accessories to be later described.

This invention operates substantially as follows: As in Fig. 1, the wheel 8 is laid flat on the plate 9 with its center hub opening surrounding the tube 14. The pedal 21 is then depressed against the tension of the spring 25, until the cam 15 forces the jaws 26, 27 outward into overhanging and locking contact with the hub opening in the wheel 8 against the tension of the garter spring 15'. The spring 16 yields slightly to this pedal pressure until the pawl plate 24 registers with a notch in the ratchet 23, where it is securely held by the tension of the spring 16, with the cam 15 wedged tightly against the three jaws such as 26, 27.

The bead dislodging tool A comprises the main lever 37 having the offset jaw 38 fixed thereto at 39 the ends of this main lever and jaw both have curved lower ends terminating in tapered points at 40, as in Fig. 1. The link 41 extends between the main lever 37 and the fulcrum pin 35 and has a plurality of notches such as 43, adapted to selectively engage the fulcrum pin 36. The fulcrum lever 44 is pivoted at 45 between the main lever and the offset jaw 38 and terminates in an end at 46 registering with and laterally alined with the jaws such as 40 on the main lever and the offset jaw.

The operator grasps both levers 37, 44 in one hand and engages the proper tooth at 43 in the end of the link, with the pin 36 in the yoke, to bring the alined points at 40, 46 against the flange 5 of the wheel rim. A backward pull on both levers forces the points 40, 46 between the inner side of the flange and the outer bead 3 of the tire. Then the operator grasps the levers in each hand respectively, and swings the outer lever 44 backward and downward, while pulling the main lever 37 backward to keep the end 40 beneath the flange 5. The backward pull on the outer lever 44 causes the end 46 to act as a fulcrum beneath the flange 5 and swing the pivot 45 downward and inward causing the points 40 to push the bead 3 downward toward the drop center of the rim. This operation is repeated around the tire, swinging on the stem 35, until the bead 3 is freed from the flange 5.

If the inner bead 2 is badly "frozen" to the inner flange 4 it can be separated as above described by reversing the tool A and hooking the notch 76 in the link 41, over the top of the arcuate fulcrum bracket 77 fixed to the legs 10, 11 and manipulating the levers 37, 44 in the manner described for separating the bead 3 from the flange 5.

The second step is to straddle the Y shaped end of the tool B, see Fig. 8, over the points 40, 46 until the ends 47, 48 enter the drop center 49 of the rim within the circle of the bead 3. The tool A is then withdrawn. The offset handle 50 of the tool B is then swung inward toward and past the tube 14, which lifts the bead 3 above the flange 5.

The third step is accomplished by the tool C having the handle with the notched head 51, adapted to engage the fulcrum pin 36, so that the lug 52 having the angular head 53 with its end 54 extending outward beyond the lug 52. This extended end 54 is entered beneath the bead 3 with the head 53 resting upon the top edge of the flange 5. The head 51 is then dropped into the swivel yoke until the appropriate notch engages the anchor pin 36. The lug 53 is then swung around the circumference of the flange 5, until the bead 3 is entirely lifted above the flange. The tool C is then removed and the operator has access to the interior of the casing for the removal of the inner tube 7 in the usual manner.

If it is desired to remove the tire entirely from the rim the tool C is reversed, as in Fig. 4, bringing the tool D into operative position. There are tires that can be lifted free of the rim in the third step above, by a continued lifting of the tool C until the inner bead 2 is freed.

The tool D is entered from below until it passes between the flanges 4, 5 of the rim and the beads 2, 3, of the tire. The whole tire casing is then forced upward until the lever handle levels off as in Fig. 4, and the curved end 55 engages the tube 14 which acts as an anchor pivot and the offset portion 58 having the bevel edge 59 supports the under side wall of the tire. The operator then walks around the tire until it swings free of the rim and may be lifted up, for inspection or repair.

The operation of remountinng the tire 1 on the rim, as in Figs. 5, 6, is accomplished by the tool E on the opposite end of the lever handle 50, see Fig. 5. This handle has the anchor link 60 pivoted thereto at 61, and having the notched end 62 adapted to engage the fulcrum pin 36. The pusher head 63 is pivoted at 64 to the end of the lever 50 and extends in a direction opposite to the pusher extension 60 and is joined thereto by the toggle link 65 pivoted at 66, and forming a toggle.

The first step in replacing the tire is to lay the casing 1 on top of the rim with the inner bead 2 extending below the top flange 5 for about one-half its circumference. The notched end 62 is then engaged with the fulcrum pin 36 and the V notch at 68 is placed against the inner bead 2 exposed above the flange 5 where it rises above the flange. An inward push on the handle lever 50 acting through the toggle, pushes the end 62 against the pin 36 and the end 68 against the bead 2. This action is repeated progressively along the exposed bead 2 until it drops below the flange 5. The edge of the bead is protected against the shearing action of the end at 68, by the lug 69 projecting laterally therefrom, see dotted lines, Fig. 7.

The pointed end 70 of the pusher head 63 is overhung by the socket at 71 formed on the guard 72 straddling the head at 68 and having the slots as at 73 engaging the cross pin 74 and holding the guard in adjustable position on the end portion of the pusher head. The cross bridge 75 on the guard is then held at a better angle to push downward against the inner edge of the bead 2, and the inner tube 7 is protected against injury by the sharp point 70.

In replacing the outer bead 3 the guard is lifted as in Fig. 6, to cause the bridge 75 to lie flat against the outer angle of the outer bead 3 and the adjacent outer wall of the tire casing 1, during the pushing operation described, as in Fig. 7. It will be noted that the outer corner of the bead 3 is substantially a right angle, and that the inner angle of the inner bead 2 is an acute angle, requiring that the pusher notch 68 be modified accordingly by the guard at 75. In old and flabby tires this function of the guard is not essential.

Having fully described this invention and its mode of operation what I claim and desire to secure by Letters Patent is:

1. A pneumatic tire machine comprising a supporting frame adapted to support a wheel having a central hub opening; a tube mounted on said frame to extend above said wheel through said hub opening, said tube having longitudinal slots through its lower portion; brackets on said tube on opposite sides of said slots; a plurality of cam surface - equipped jaws pivoted between said brackets respectively, said jaws being normally retained within said tube but being movable through said slots; a conical cam slidable within said tube and engaging said cam surface of said jaws and having a depending stem; and a foot pedal pivoted to said frame and connected to said stem for forcing said jaws outwardly into engagement with the hub opening of said wheel.

2. A pneumatic tire machine comprising a supporting frame adapted to support a wheel having a central hub opening; a tube mounted on said frame to extend above said wheel through said hub opening, said tube having longitudinal slots through its lower portion; brackets on said tube on opposite sides of said slots; a plurality of cam surface-equipped jaws pivoted between said brackets respectively, said jaws being normally retained within said tube but being movable through said slots; a conical cam slidable within said tube and engaging said cam surfaces of said jaws and having a depending stem; a foot pedal pivoted to said frame and connected to said stem for forcing said jaws outwardly into engagement with the hub opening of said wheel; a bushing in the upper end of said tube above said cam; and a yoke with a stem rotatable in said bushing and having a transverse fulcrum pin adapted to engage tire manipulating accessories.

BENJAMIN E. MOLTZ.

REFERENCES CITED

The following references are of record in the file of this patent:

UNITED STATES PATENTS

| Number | Name | Date |
| --- | --- | --- |
| 220,995 | Shedlock | Oct. 28, 1879 |
| 656,057 | Stephens | Aug. 14, 1900 |
| 1,025,987 | Long | May 14, 1912 |
| 1,316,390 | Rischard | Sept. 16, 1919 |
| 1,353,020 | Brand | Sept. 14, 1920 |
| 1,591,193 | Weaver | July 6, 1926 |
| 2,034,819 | Maulis | Mar. 24, 1936 |
| 2,081,402 | Krema | May 25, 1937 |
| 2,194,936 | Hatch | Mar. 26, 1940 |
| 2,201,982 | Bazarek | May 28, 1940 |
| 2,319,155 | Passanante et al. | May 11, 1943 |
| 2,419,352 | Heitzman | Apr. 22, 1947 |